United States Patent [19]

Zscheile, Jr. et al.

[11] Patent Number: 5,559,788
[45] Date of Patent: Sep. 24, 1996

[54] MULTIPLE CHANNEL QUADRATURE COMMUNICATION SYSTEM AND METHOD

[75] Inventors: John W. Zscheile, Jr., West-Farmington; Michael L. Wilson, Salt Lake City; Richard J. Saggio, Salt Lake City; Alan E. Lundquist, Salt Lake City, all of Utah

[73] Assignee: Unisys Corporation, Blue Bell, Pa.

[21] Appl. No.: 366,198

[22] Filed: Dec. 29, 1994

[51] Int. Cl.⁶ .................................................. H04J 13/00
[52] U.S. Cl. .................................................. 370/18; 370/20
[58] Field of Search .................... 370/18, 19, 20, 370/21, 22, 69.1, 121, 76, 110.1; 375/200, 205, 206, 208, 209, 210, 260, 261, 262, 263, 264, 265, 266, 267, 302, 308; 455/102, 103, 104, 105

[56] References Cited

U.S. PATENT DOCUMENTS

| | | | |
|---|---|---|---|
| 4,308,617 | 12/1981 | German, Jr. | 375/208 |
| 5,136,612 | 8/1992 | Bi | 375/205 |
| 5,289,499 | 2/1994 | Weerackody | 370/18 |
| 5,305,353 | 4/1994 | Weerackody | 375/267 |

*Primary Examiner*—Wellington Chin
*Assistant Examiner*—Huy D. Vu
*Attorney, Agent, or Firm*—John B. Sowell; Mark T. Starr; Thomas J. Scott

[57] ABSTRACT

A transmitter is provided which simultaneously transmits waveforms such as with different data rates. These transmissions are modulated (e.g. phase modulated) onto quadrature channels of a common carrier, and are then combined. The resulting composite modulated waveform is upconverted to RF, power amplified, split and routed to separate ports for transmission. The transmitted signals are then received, downconverted and demodulated to produce the original signals.

7 Claims, 7 Drawing Sheets

5,559,788

MULTIPLE CHANNEL QUADRATURE COMMUNICATION SYSTEM AND METHOD

FIELD OF THE INVENTION

The present invention relates to communications such as pulse or digital communications, and more particularly to spread spectrum communications using plural paths or channels, such as direct sequence spread spectrum communications.

BACKGROUND OF THE INVENTION

For many applications, it is desirable to have multiple signals simultaneously use the same channel. Such an approach conserves bandwidth, simplifies modulation and demodulation parameters, reduces cost, etc. Time-sharing a single channel requires careful coordination of operation of transmitting and receiving stations, possible need for a separate timing signal (which may be particularly disadvantageous in a wireless or atmospheric communication system) and furthermore reduces the amount of data or information that can be transmitted in a given time.

For example, a communication system can be provided in which several receiving stations are located at various points and receive data from a single transmitting station which is located at another point. For such a system, control signals could be transmitted continuously to all receivers, while each set of data signals would be transmitted only between a pair of platforms. For such a system, it is obviously desirable that all such signals occupy the same frequency band and be simultaneously transmitted, so that for example control is not lost while data is being transmitted. The present invention fulfills these needs.

If separate bands are used, then separate modulators, spreaders (if used), upconversion to RF transmission frequency, transmitters, power amplification for each transmission and additional power supplies would be necessary. Likewise, at the receiving end, in order to receive more than one transmission at the node or site at the same time, additional demodulators, downconverters, power supplies, etc. must also be provided, or else not receiving both signals simultaneously must be conceded. Frequency allocations also become unwieldy. Either situation would be cluttered and chaotic.

SUMMARY OF THE INVENTION

Accordingly, an object of the present invention is to eliminate the need for separate modulation (and other operations if needed) for each transmission.

Another object of the present invention is to eliminate the need for separate modulation, separate upconversion to RF frequency, and separate power amplification for each transmission.

Further objects of the present invention are to provide significant size, weight and cost reductions due to elimination of all but one chain of modulation, up conversion and power amplification.

Still another object of the present invention is to provide apparatus and method for simultaneous transmission and reception of multiple signals on a single channel.

Yet another object of the present invention is to eliminate the need for separate demodulation (and other operations if needed) for each reception.

A further object of the present invention is to eliminate the need for separate demodulation and separate downconversion from RF frequency for each reception.

Still other objects of the present invention are to provide significant size, weight and cost reductions due to elimination of all but one chain of demodulation and downconversion.

Briefly, these and other objects of the present invention are accomplished by a transmitter which simultaneously transmits waveforms such as with different data rates. These transmissions are modulated (e.g. phase modulated) onto quadrature channels of a common carrier. The composite modulated waveform is upconverted to RF, power amplified, split and routed to separate ports for transmission. The transmitted signals are then received, downconverted and demodulated to produce the original signals. Although more than one chain of downconverter and demodulator can be utilized for this purpose, each such chain is nonetheless capable of producing each of the originally transmitted signals.

For example, a single transmitter could transmit both higher and lower rate data waveforms in which the higher rate transmission requires directional antenna transmission to a selected receiver and the lower data rate channel requires omnidirectional antenna coverage for a plurality of receivers (including the selected receiver). Both the higher and lower data rate transmissions are then phase modulated onto quadrature channels of a common carrier. The resulting composite modulated waveform is then upconverted to RF, power amplified, split, and routed to directional and omni directional ports for transmission. In this manner, more than one signal can be simultaneously transmitted on a single band. At the receiving end, the transmitted signals are then downconverted and demodulated to produce the original signals. The separate transmissions are thereby combined into a common signal, from which they are decombined or separated by the receiver.

Other objects, advantages and novel features of the invention will become apparent from the following detailed description of the invention when considered in conjunction with the accompanying drawings.

DETAILED DESCRIPTION

Some of the terminology employed below has been employed in prior art patents such as U.S. Pat. No. 4,225,935 issued Sep. 30, 1980 for "Coding Method and System with Enhanced Security" by John W. Zscheile, Jr. et al. and U.S. Pat. No. 3,728,529 issued Apr. 17, 1973 for "Two-Way Communication System Employing Two-Clock Frequency Pseudo-Noise Signal Modulation" by Earl M. Kartchner et al, both assigned to the same assignor as this application, and also in references cited in those patents. The Zscheile, Jr. et al '935 patent, and the Kartchner et al patent, are hereby incorporated by reference herein.

Figure 1:
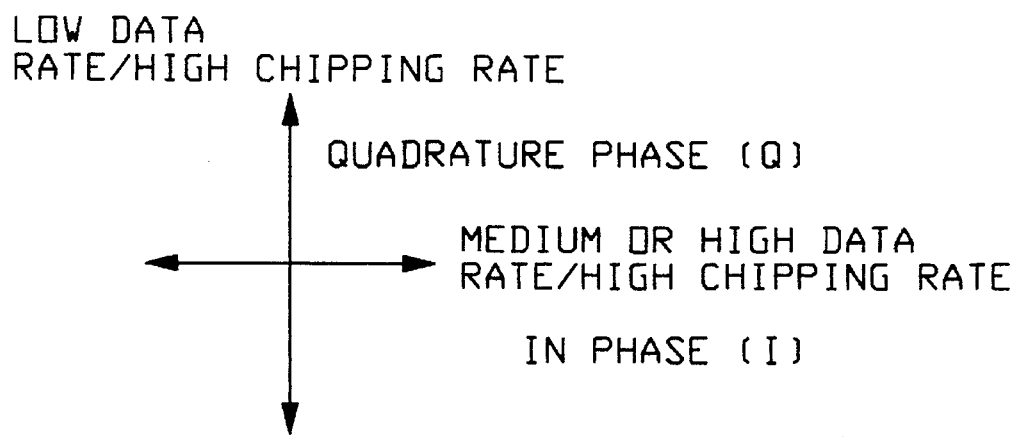
FIG. 1 illustrates the quadrature relationship between in phase signal I and quadrature phase signal Q which can be transmitted and received by the present invention.
Figure 2:
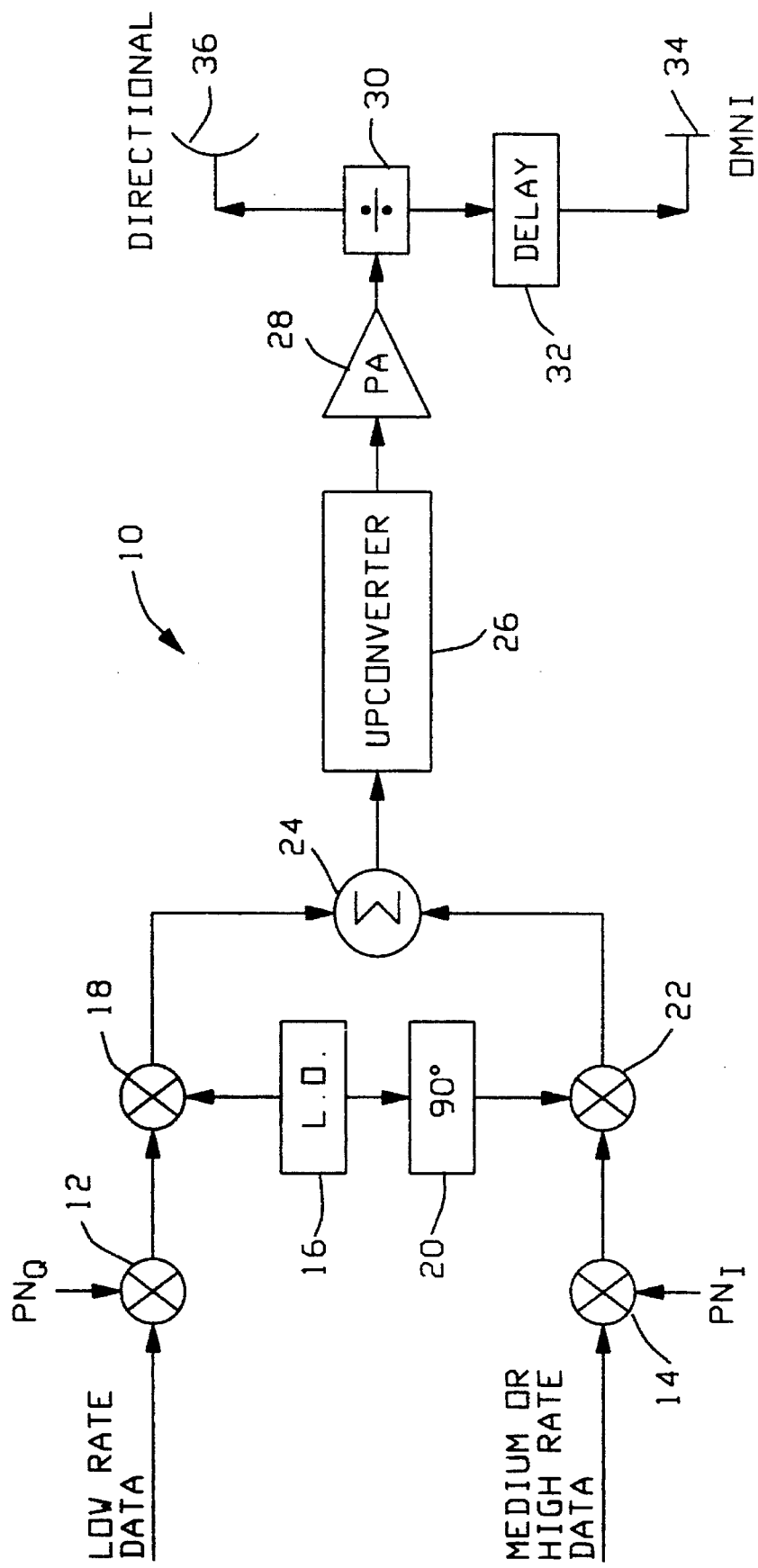
FIG. 2 shows one embodiment of a dual channel quadrature modulation system according to the present invention.
Figure 3:
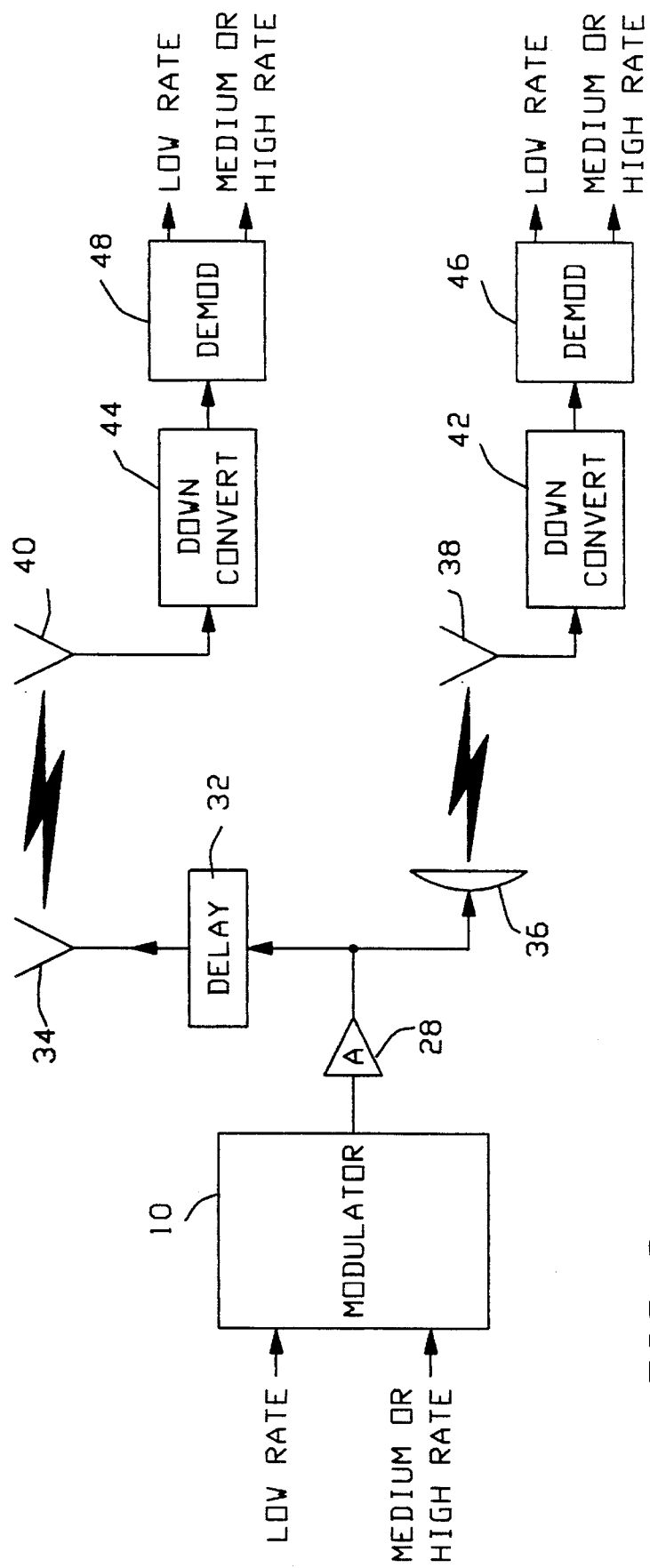
FIG. 3 shows one embodiment of a dual channel communication system according to the present invention.

Referring now to the drawings, wherein like reference characters designate like or corresponding parts throughout the several views, there is shown in FIG. 1 the desired synergistic waveform produced by the system of FIG. 2. As shown in FIGS. 1, 2 and 3, two signals can be transmitted and received through common circuitry. The two signals illustrated in FIG. 1 are an in-phase (I) high or medium data rate signal with a high chipping rate, and a quadrature phase (Q) signal having a low data rate and a high chipping rate. The low data rate can for example be on the order of tens of kilobits per second.

Although the present invention can be otherwise utilized, there is discussed below an embodiment of the present invention wherein a single transmitter simultaneously transmits an omnidirectional signal to a network having a plurality (e.g. 32) of users connected thereto in a network with a star topology, and individually sends data at a faster rate (e.g. at a T1 rate) from that transmitter to any one of those users. Thus, there is provided a nodeless, circuit switched T1 (or other data rate) network, overlaid by a TDMA/DAMA (demand assigned multiple access) packet-switched network with a star topology. Such a system includes a network capable of transferring data at a certain rate (such as T1) between two platforms, and a network handling a plurality of users and capable of controlling the data transfer network. This would be a nodeless, circuit switched data transfer network, overlaid by a centrally-controlled DAMA/TDMA packet-switched network with a star topology for controlling that data transfer network. The control signal is omnidirectionally broadcast to all net members or users. When required, a data signal is transmitted at a faster rate to a given member.

The system 10 of FIG. 2 accomplishes such transmission. Modulator 10 combines two orthogonal pseudonoise (PN) codes with respective high and low data rate signals. The resulting two orthogonal spread signals are then quadrature modulated onto a carrier and power amplified. One of the resulting signals is then delayed by a fixed delay (e.g. one microsecond). The two signals are then coupled into two separate antennas, an omnidirectional antenna 34 and a dish or other directional antenna 36, for transmission. As shown in FIG. 2, the low data rate signal is combined by mixer or multiplier 12 with a quadrature phase PN signal $PN_Q$; the resulting spread signal is then provided to mixer or multiplier 18. The high or medium rate data signal is combined by mixer or multiplier 14 with an in-phase PN signal $PN_I$; the resulting signal is then provided to mixer or multiplier 22. The two data signals are thereby converted into two orthogonal spread signals which are then quadrature modulated in the following manner. The signal produced by mixer or multiplier 12 is combined by mixer or multiplier 18 with the output of a local oscillator 16. The output of local oscillator 16 is also provided to a phase shifter or other device 20 which changes the phase of the received local oscillator 16 output by 90 degrees. Mixer or multiplier 22 then combines the output of mixer or multiplier 14 with the output of phase shifter or other device 20. The signals produced by mixers or multipliers 18 and 22 are thereby quadrature modulated onto a carrier. The signals produced by mixers or multipliers 18 and 22 are then combined by summer 24. The resulting signal produced by summer 24 is provided to upconverter 26, which changes the incoming modulated carrier frequency to a higher frequency which is within the range of the intended receiver or receivers. The upconverted signals from upconverter 26 are then amplified by power amplifier 28. The amplified output from power amplifier 28 is then divided by divider 30 for provision to antennas 34 and 36. Preferably, a delay 32 is imposed on the signal provided by divider 30 to omnidirectional antenna 34; this delay would preferably be on the order of hundreds of nanoseconds. Although delay 32 is not absolutely needed for practice of the present invention, its inclusion is advantageous in that delay 32 makes it more difficult for a third party to intercept the transmitted signal(s). Delay 32 can be applied to directional antenna 36 instead of to omnidirectional antenna 34. The delay applied by delay 32 should preferably be at least 100 nanoseconds (1 chip time), but a one microsecond (1000 nanosecond) delay is preferred.

Figure 4:
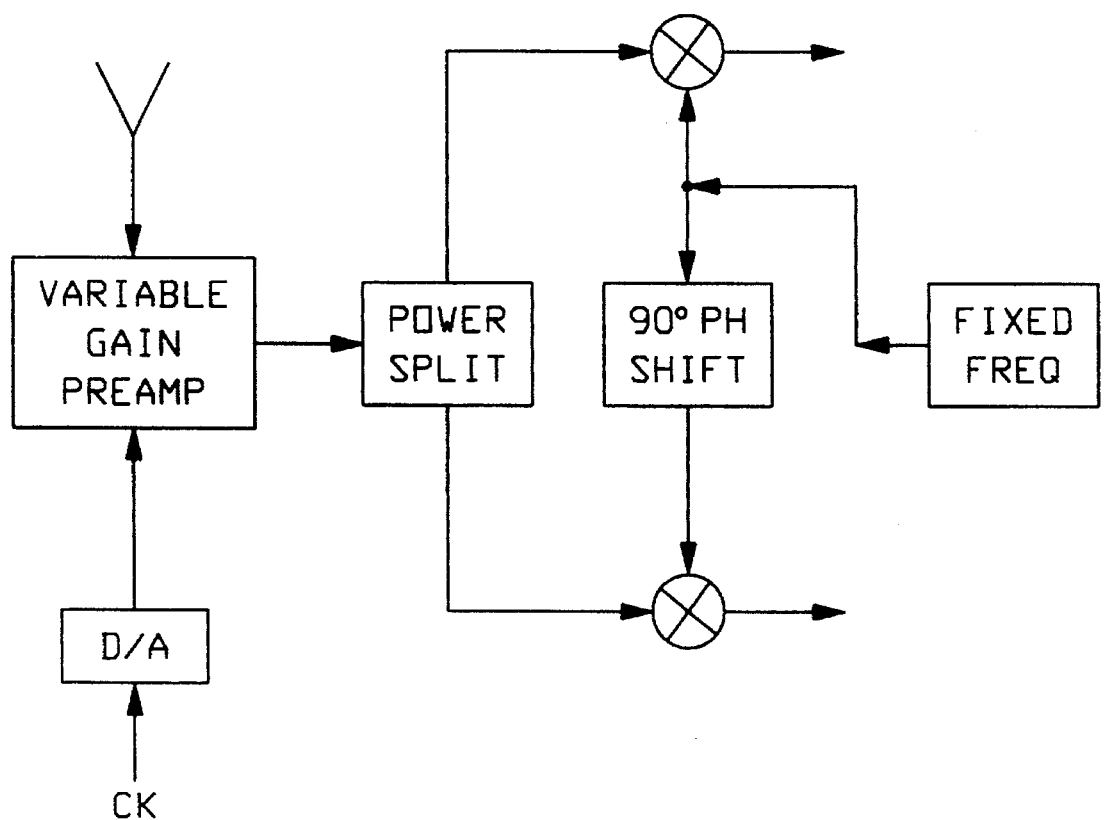
FIG. 4 shows one embodiment of a downconverter that can be utilized in the system of FIG. 3.

The signals transmitted from antennas 34 and 36 would then be received by antennas 38 and 40. In each such case, the received signals are provided to respective downconverters 42 and 44. Each downconverter 42 and 44 changes the incoming modulated carrier frequency to a lower frequency which is within the tuning range of the respective demodulators 46 and 48. Upconverters and downconverters are standard well-known existing components. One example of a downconverter which can be utilized for downconverter 42 and for downconverter 44 is shown in FIG. 4, which is adapted from a portion of FIG. 1 of U.S. Pat. No. 5,084,913 issued Jan. 28, 1992 for "Programmable Multi-Mode Two-Channel Timing Generator" by Samuel C. Kingston et al. The Kingston et al. patent is hereby incorporated by reference herein. FIG. 1 of the Kingston et al. patent is described in that patent at column 2, line 23 through column 3, line 10. Upconverter 26 can then be what is shown in FIG. 4 but with the process operated in reverse (all arrow directions reversed). However, other downconverters could be instead employed for that purpose. However, any suitable upconverter and downconverters could be utilized instead. Demodulator 48 would not necessarily produce the medium or high data rate signal unless the omnidirectional antenna 34 is relatively close to receiving antenna 40. Receiving antenna 40 could be a directional dish antenna (assuming that the relative location of omnidirectional antenna 34 to antenna 40 is known) or could alternatively be an omnidirectional antenna for low cost terminals. Both received signals are quadrature downconverted to an intermediate frequency and passed to demodulators 46 and 48 for demodulation.

Figure 5:
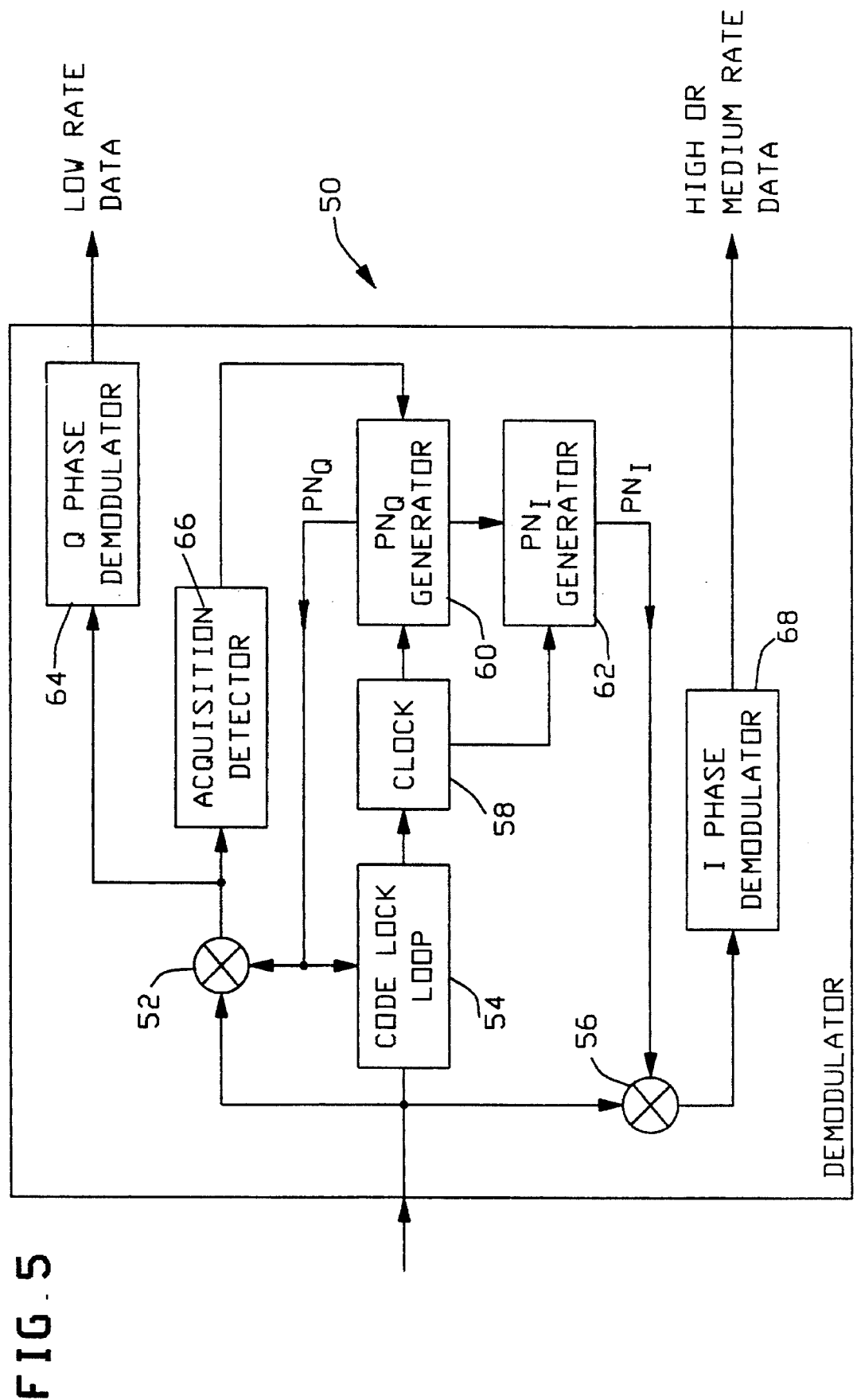
FIG. 5 shows one embodiment of a demodulator that can be utilized in the system of FIG. 3.

Demodulator 46 and demodulator 48 of FIG. 3 are preferably each configured as shown in FIG. 5. FIG. 5 shows a preferred demodulator 50 which can be so utilized in the present invention. As discussed above, although a medium data rate output is shown from each of demodulators 46, 48 and 50, it is not expected that the medium rate output of demodulator 48 would be usable, for reasons given above. A received downconverted signal is provided to mixer or multiplier 52 code lock loop 54 and mixer or multiplier 56. The output of code lock loop 54 is provided to trigger clock 58, which in turn triggers PN generators 60 and 62. It is assumed that the receiver knows which PN signals have been applied in modulator 10, and would here produce those signals in demodulator 50 for demodulation purposes. Generator 60 produces the Q PN signal, while generator 62 produces the I PN signal. The Q PN signal is provided to code lock loop 54 to close that loop, and to mixer or multiplier 52 to be combined with the received downconverted signal. Mixer or multiplier 52 thus provides a despread or unspread signal which then can be demodulated by Q phase demodulator 64 to produce the low rate or control data. The signal produced by mixer or multiplier 52 is also checked for quality of signal acquisition by acquisition detector 66, which in turn triggers $PN_Q$ generator 60 as needed. The $PN_I$ signal produced by generator 62 is provided to mixer or modulator 56. Mixer or modulator 56 combines the $PN_I$ signal with the received downconverted signal to despread or unspread that signal. The output of mixer or multiplier 56 is then provided to I phase demodulator 68, which produces the demodulated medium rate data.

As discussed in the immediately preceding paragraph and shown in FIG. 5, code lock loop 54 tracks on the low data rate channel. This is done because the low data rate channel has greater processing gain than does the higher (high or medium) data rate channel. This criterion would be particularly significant in a jammer environment, but should not matter in a white noise environment. In the latter situation, the code lock loop could be connected and utilized to lock and track on $PN_I$ instead of $PN_Q$.

Figure 6:
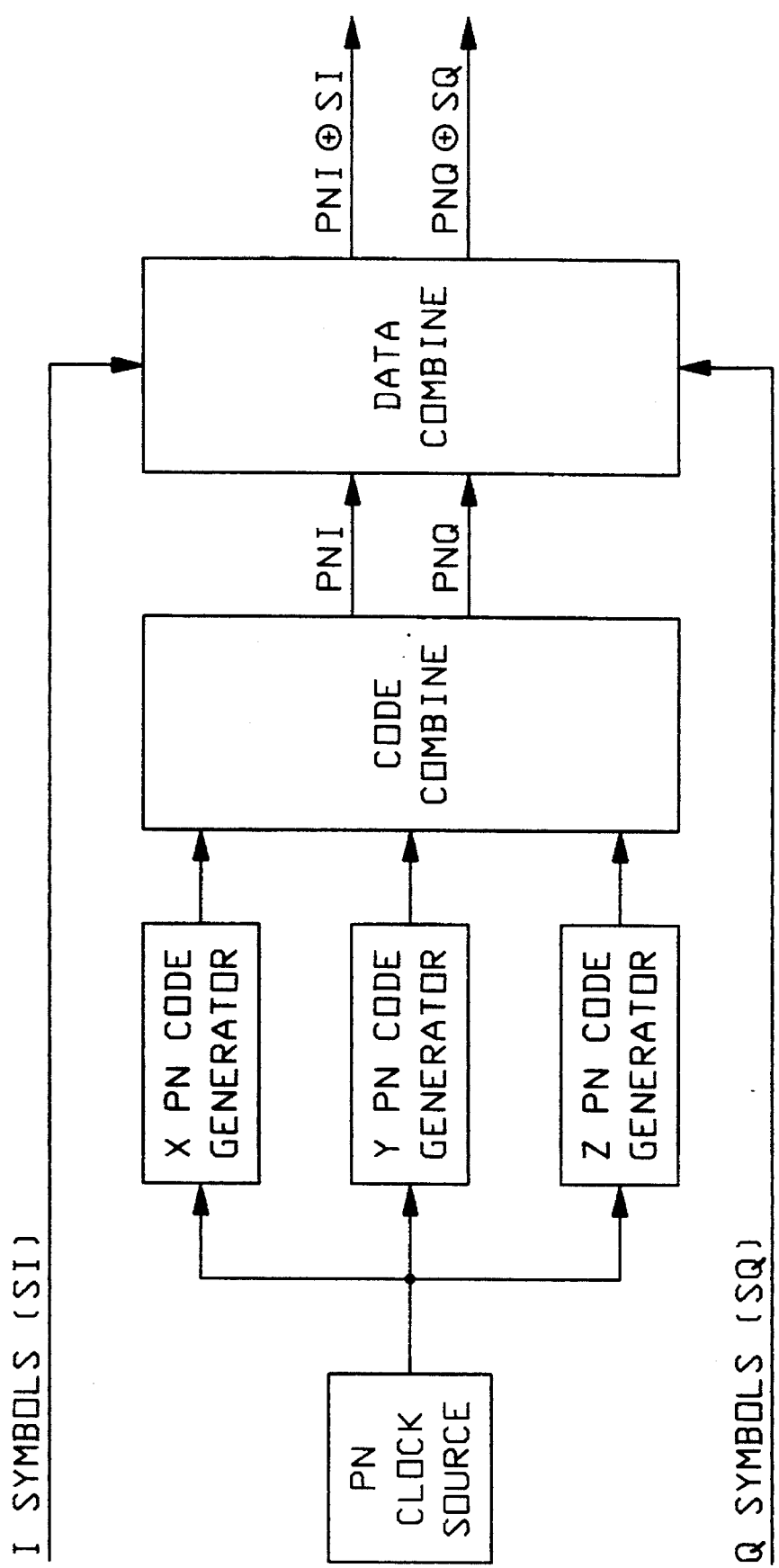
FIG. 6 is a top level block diagram of a preferred embodiment of a pseudonoise (PN) code generator and modulator that can be utilized with the system of FIG. 2 and in the system of FIG. 5.
Figure 7:
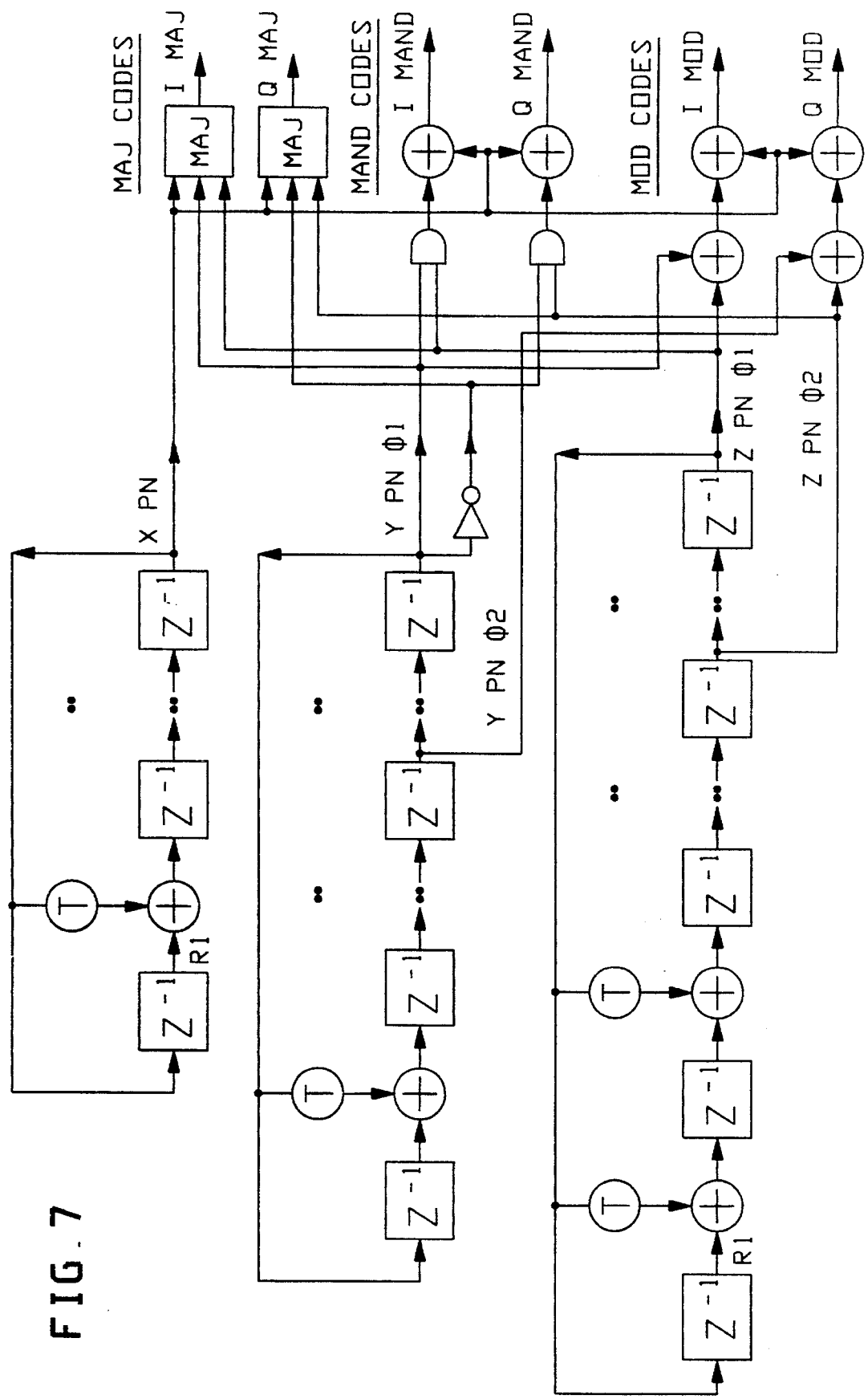
FIG. 7 is a block diagram of the system of FIG. 6 shown in greater detail, showing PN code generation and code combining logic for producing MAJ, MAND and MOD codes.
Figure 8:
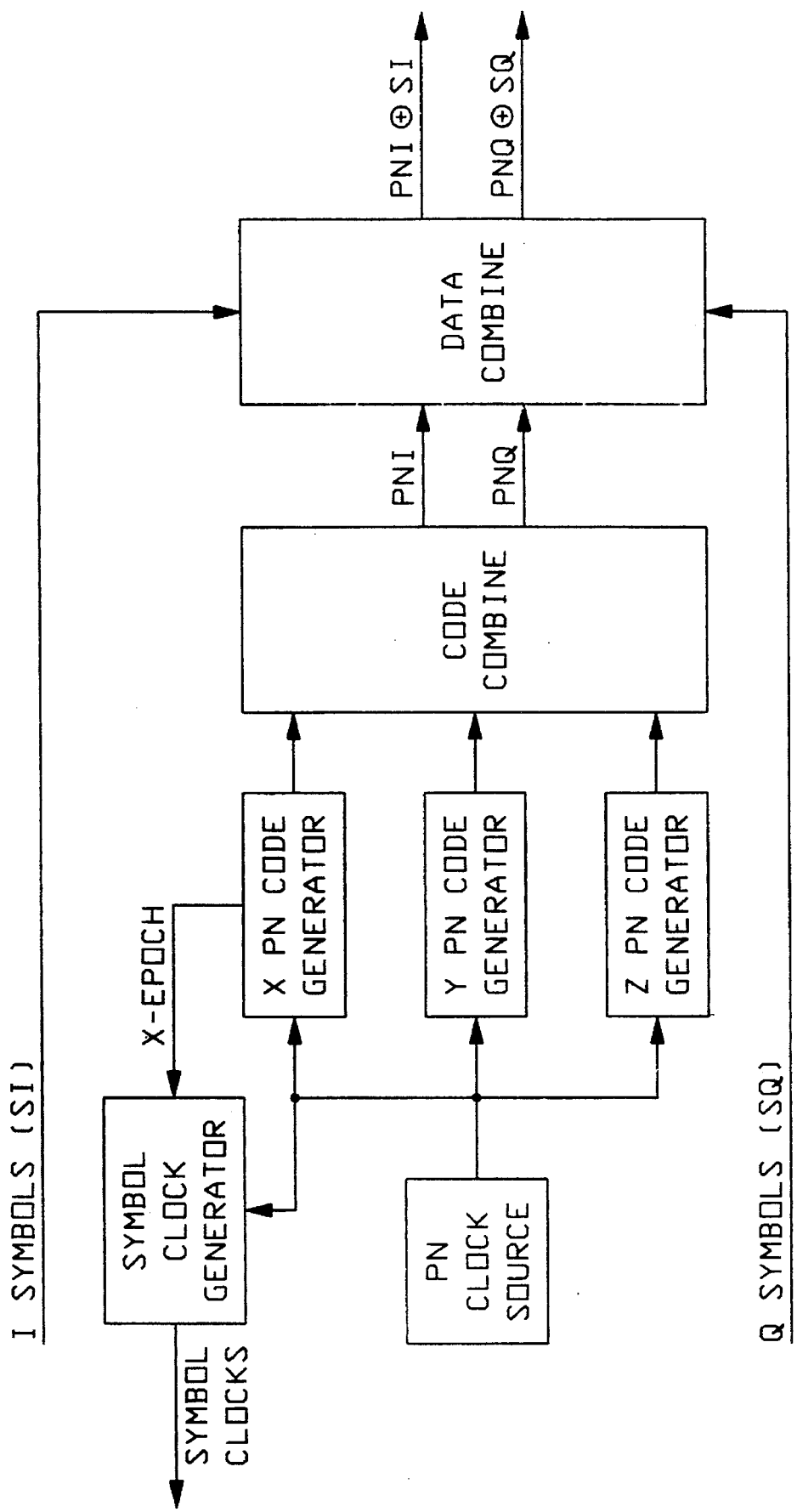
FIG. 8 is a top level block diagram of an alternative preferred embodiment of a PN code generator and modulator that can be utilized with the system of FIG. 2 and in the system of FIG. 5.

For the devices of FIGS. 2 and 3 to function properly, it is necessary that the two PN codes $PN_I$ and $PN_Q$ be mutually orthogonal. Preferred ways of producing such PN codes are shown in FIGS. 6, 7 and 8. FIGS. 6, 7 and 8 are respectively adapted from FIGS. 1, 9 and 1A of our U.S. patent application Ser. No. 08/348,669 filed Dec. 2, 1994 for "Apparatus and Method for Generating and Utilizing Pseudonoise Code Sequences", which provides a description of those figures. Our U.S. patent application Ser. No. 08/348,669 is hereby incorporated by reference herein.

Although what is described in our U.S. patent application Ser. No. 08/348,669 filed Dec. 2, 1994 is preferred, pseudonoise signals $PN_I$ and $PN_Q$ can be produced by other means. For example, two random PN codes could be selected for this purpose; there would then be a substantial probability that two such random PN codes would be mutually orthogonal. However, what is taught in our U.S. patent application Ser. No. 08/348,669 filed Dec. 2, 1994 is preferred, in that what is taught therein guarantees that the two PN codes produced therein will be mutually orthogonal.

Some of the many advantages of the invention should now be readily apparent. For example, a novel dual channel quadrature modulation system has been provided which simultaneously transmits high (or medium) and low data rate waveforms in which the higher such rate transmission requires directional antenna transmission and the low data rate channel requires omnidirectional antenna coverage. Such modulation eliminates the need for separate modulation, upconversion to RF frequency, and power amplification for each transmission. Significant size, weight and cost reductions are thereby possible due to elimination of one (or more) chain(s) of modulation, upconversion, and power amplification. If the control waveform is to be continuously broadcast to all users or net members, and higher rate data will be transmitted individually to a given member as required, it would appear that two modulators, spreaders, transmitters and additional power supplies would be necessary. This would complicate matters at the receiving end; in order to receive both such transmissions, additional demodulators, etc., must also be provided or else it would be necessary to concede that both such signals could not be received simultaneously. Such shortcomings are avoided by the present invention.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. Apparatus for communication of multiple signals, comprising:

pseudonoise generating means for generating at least one mutually orthogonal pair of pseudonoise signals;

first combining means for combining one of an orthogonal pair of said pseudonoise signals with a first signal to produce a first spread signal;

second combining means for combining the other of said orthogonal pair of pseudonoise signals with a second signal to produce a second spread signal;

modulating means for modulating the first and second spread signals with a common carrier that is shifted in phase for the two spread signals to produce first and second modulated signals;

third combining means for combining said first and second modulated signals to produce a combined signal;

a first data antenna for receiving the combined modulated signals for transmitting same to predetermined receivers; and a second control antenna for receiving the combined modulated signals for transmitting same as a control signal for a plurality of receivers.

2. Apparatus as recited in claim 1, further comprising, interposed between said third combining means and said first and second antennas:

frequency conversion means for frequency converting said combined signal to produce a frequency converted combined signal; and splitting means receiving the combined frequency converted signal for power splitting the converted combined signal into a third signal for provision to said first antenna in place of said first modulated signal, and for provision to said second antenna in place of said second modulated signal.

3. Apparatus as defined in claim 2, further comprising an amplifier interposed between said frequency conversion means and said splitting means for amplifying the frequency converted signal.

4. Apparatus as defined in claim 1, further comprising a delay applied to said first antenna to delay by a fixed amount any signal provided to said first antenna.

5. Apparatus as defined in claim 1, further comprising:

receiver antenna means for receiving signals from first and second antennas; and demodulation means for demodulating the received signals.

6. A method for communicating a plurality of signals, comprising the steps of:

combining a first digital signals with a first pseudonoise signal and combining a second digital signal with a second pseudonoise signal, wherein said second pseudonoise signal is orthogonal to said first pseudonoise signal;

modulating the respective digital signals produced by the above combining step to produce first and second modulated signals wherein the digital modulation signal applied to one signal is phase shifted with respect to the modulation signal applied to the other such signal;

combining the first and second digital modulated signals to produce a combined signal;

frequency converting the combined signal to produce a frequency converted signal;

power splitting the frequency converted signal produced by said frequency converting step; and applying the split signals, produced by said splitting step to two separate antennas.

7. A method as set forth in claim 6 wherein the step of applying the split signals to separate antennas includes the steps of applying the split signals to a data antenna and to a control antenna.

* * * * *